April 27, 1937.  W. H. RABE  2,078,510
METHOD AND APPARATUS FOR OVERHEAD IRRIGATION
Original Filed Oct. 14, 1933   3 Sheets-Sheet 1
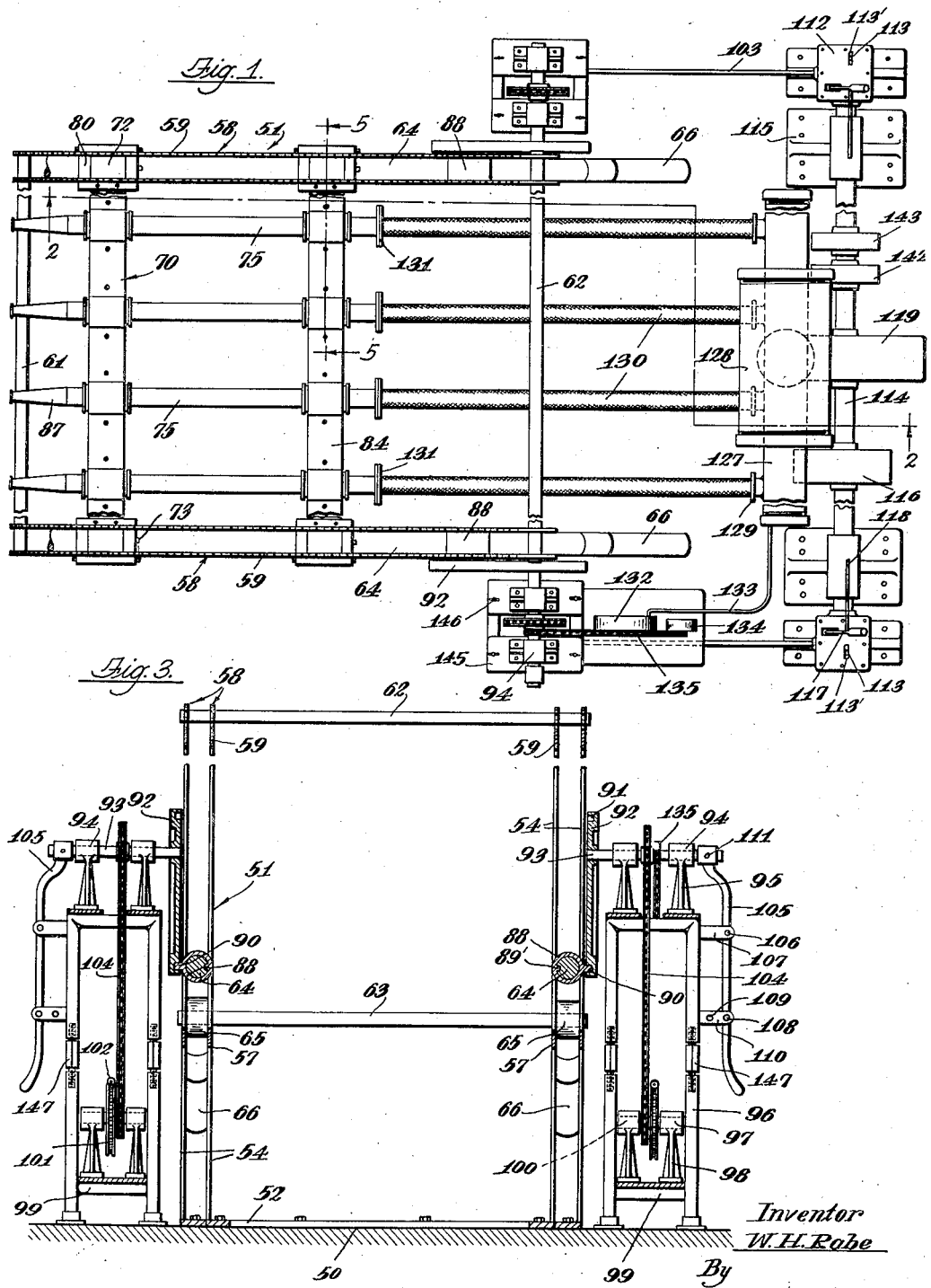

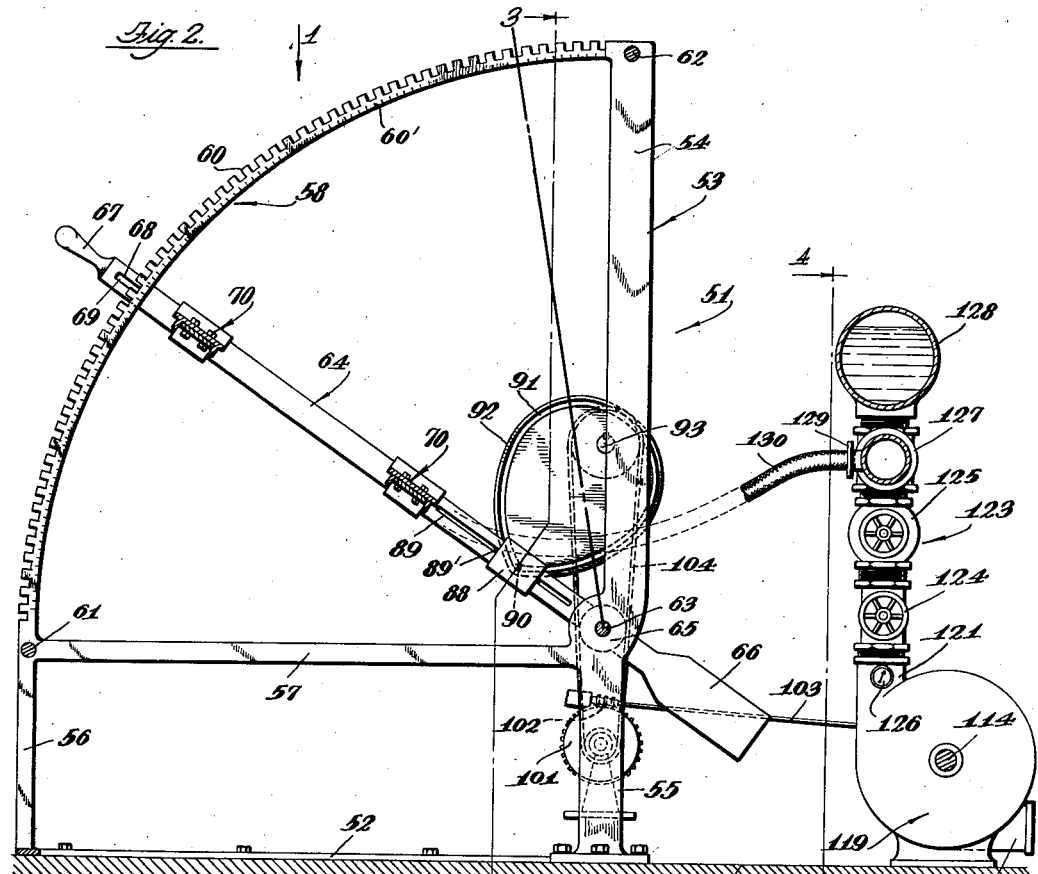
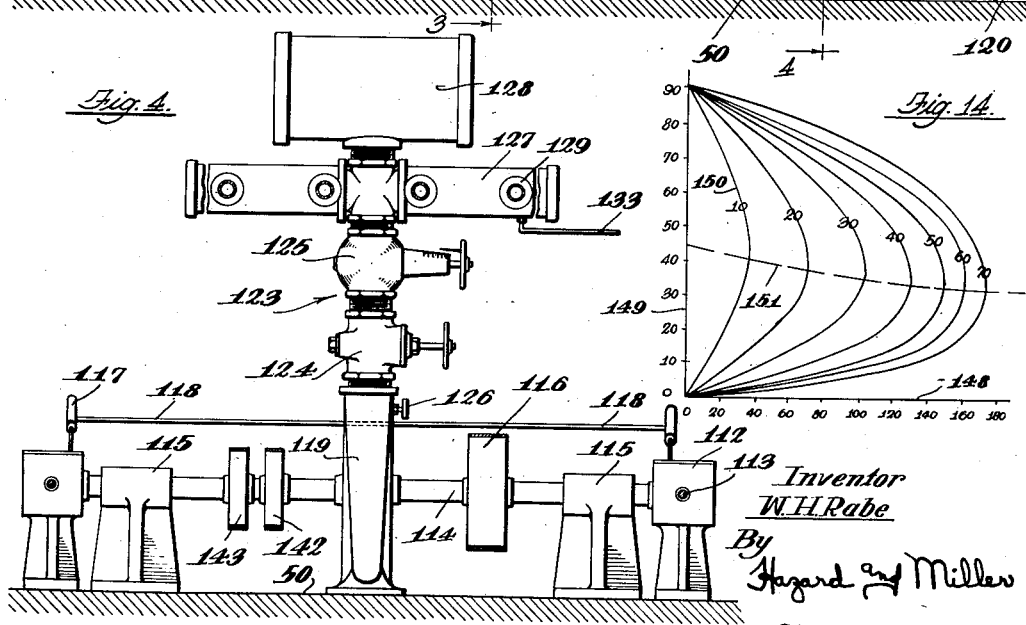

April 27, 1937. W. H. RABE 2,078,510
METHOD AND APPARATUS FOR OVERHEAD IRRIGATION
Original Filed Oct. 14, 1933 3 Sheets—Sheet 3
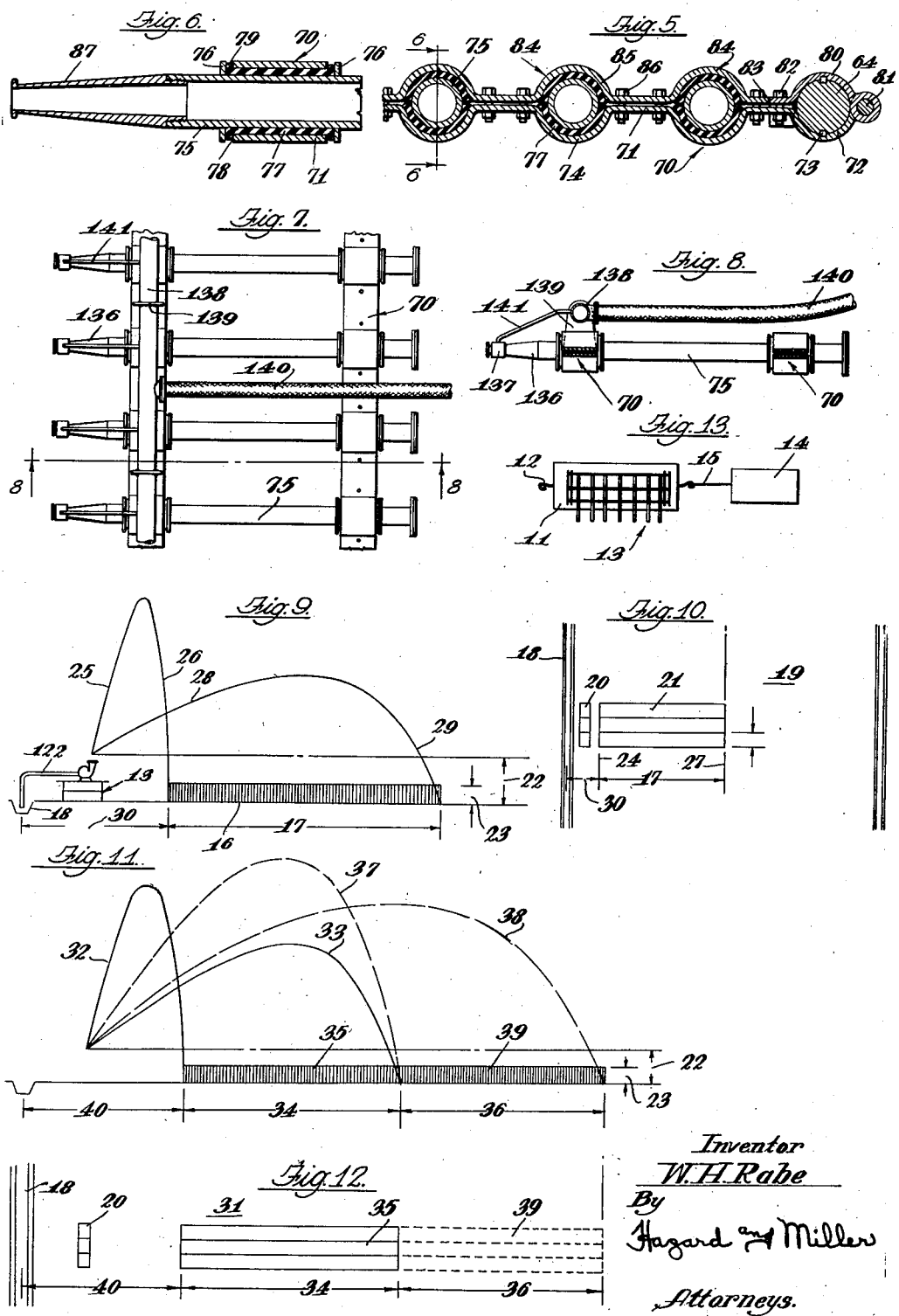
Inventor
W. H. Rabe
By
Hazard and Miller
Attorneys.

Patented Apr. 27, 1937

2,078,510

UNITED STATES PATENT OFFICE 2,078,510

METHOD AND APPARATUS FOR OVERHEAD IRRIGATION

Willy H. Rabe, Ventura, Calif.

Application October 14, 1933, Serial No. 693,633
Renewed February 16, 1937

11 Claims. (Cl. 299—62)

My invention relates to an overhead type of irrigation in which the water is deposited on the land much in the form of vertically descending rain. It distinguishes in this feature from circular spray types of irrigation or those from overhead lines of pipe in which a great deal of water strikes the ground and the crops at an angle to the vertical.

An object and feature of my invention in developing the overhead type of irrigation dropping much in the form of vertical rain is in discharging the water in streams having different trajectories from the discharge or sprayer nozzles and in these different trajectories the water in one instance may leave the nozzle in an almost vertical direction or in a small angle to the vertical and fall on the ground in an almost vertical direction closely adjacent the nozzle. The nozzle is then oscillated to discharge more at a horizontal angle but on account of the path of the trajectories the water strikes the ground at angles approaching the vertical instead of at arcuate angles.

A further object and feature of my invention is in overhead irrigation to spray water from oscillating nozzles, these oscillating in a vertical arc and discharging the water in a path in substantially the same plane as the arc of movement of the nozzles.

A further object and feature of my invention is giving the nozzles a variable speed of motion in order to obtain substantially an equal distribution of the water over the strip of ground irrigated. If the spray nozzle is given a movement of a substantially constant speed in its oscillating arc it will be found that the strip of land irrigated receives unequal amounts of water, that is, the amount of water spread in any definite interval of time or in each stroke of the nozzle will be unequal between the positions close to the nozzle and the more remote positions irrigated. For instance, should the speed or movement of the nozzle be constant between its upper and it lower limits it will be found that the ground closer to the nozzle will be irrigated to a lesser extent or depth than that to a position more remote reached by the stream of water.

Therefore, in accordance with my invention I provide a mechanism for oscillating the nozzles which gives a slower arcuate movement to the nozzles when they are projecting water at a high angle and a relatively quicker arcuate movement when they are projection the water at a low angle to a much greater distance. In addition I may vary the speed of oscillating movement of the nozzles by altering the mechanism for arcuately swinging the nozzles. As a convenient means for oscillating the nozzles I may employ a cam and by changing the size of the cam thus vary the arcuate movement of the nozzles.

Another object and feature of my invention is to irrigate land in strips by employing a multiple number or series of nozzles preferably positioned in parallel and oscillated as a unit, these nozzles receiving water preferably at a fixed pressure throughout their oscillating stroke, the oscillation being between a high angle of projection and a relatively low angle so that a strip of land may be irrigated from one side. The oscillation may be continued until a sufficient depth of water is discharged on the ground. In using my invention by my system of irrigation I may mount the nozzles and oscillating mechanism on a truck which may be moved longitudinally adjacent one side of the field or area to be irrigated and either by intermittent or continuous slow motion of the truck strips crosswise of the field or area may be irrigated.

Another object and feature of my invention to cause the water to fall more in the nature of rain and to aerate the water is discharging air into the nozzles in order to incorporate an air stream with the discharging water. This breaks up the water into small drops.

My invention is illustrated in connection with the accompanying drawings, in which:

Fig. 1 is a plan taken in the direction of the arrow 1 of Fig. 2.

Fig. 2 is a vertical section taken on line 2—2 of Fig. 1 in the direction of the arrows.

Fig. 3 is a vertical transverse section taken on the irregular line 3—3 of Fig. 2 in the direction of the arrows.

Fig. 4 is a transverse vertical section taken on the line 4—4 of Fig. 2 in the direction of the arrows.

Fig. 5 is a transverse section taken on the line 5—5 of Fig. 1 in the direction of the arrows showing the structure for clamping the nozzles.

Fig. 6 is a longitudinal section taken on the line 6—6 of Fig. 5 in the direction of the arrows.

Fig. 7 is a plan illustrating a modified construction of nozzles showing air inlets.

Fig. 8 is a longitudinal section on the line 8—8 of Fig. 7 in the direction of the arrows.

Fig. 9 is a vertical diagram illustrating the manner of irrigating a single strip of a field.

Fig. 10 is a plan in diagram showing the manner or irrigating a single strip in a plurality of sections following the procedure of Fig. 9.

Fig. 11 is a vertical diagram illustrating the manner of irrigating a plurality of longitudinal strips of a field.

Fig. 12 is a plan in diagram showing the manner of irrigating a plurality of strips in sections in accordance with the procedure of Fig. 11.

Fig. 13 is a plan in diagram showing the mounting of the oscillating nozzles on a truck together with a towing tractor.

Fig. 14 is a chart showing the reach or throw of projected water from various angles of discharge and at various pressures.

Referring first to Fig. 13, this shows a truck 11 having tow-bars 12 at each end and on this truck there is mounted the nozzle assembly 13 including the mechanism of oscillating the nozzles. The truck is towed along one longitudinal edge of the field by means of a tractor 14 having a tow-bar 15 which tow-bar may be connected to either draw-bar 12 of the tractor and thus tow the truck in either direction.

Referring next to Figs. 9 and 10, the ground level is indicated by the numeral 16 of which the strip 17 is to be irrigated longitudinally of the field. An irrigation ditch 18 is indicated which forms the source of supply for the water. There is a ditch indicated on both sides of the field which field is designated by the general numeral 19. The tractor and truck follow along the edge of the ditch as indicated at 20 and the movement may be intermittent, that is, the truck may be stopped while individual sections 21 are irrigated or the tractor and truck may move slowly lengthwise of the field and thus irrigate the whole field without stops. The distance 22 indicates the height of the discharge nozzles above the ground surface and the distance 23 which is exaggerated in height indicates the depth of water to be deposited on the strip to be irrigated. The nozzles are oscillated so that they irrigate to a line 24 adjacent the tractor and nozzles by discharging the water at a high trajectory indicated at 25. This water falls, following the trajectory 26, and strikes the ground in a substantially vertical fall. The remote edge 27 of the strip is irrigated by discharging the water with a trajectory 28 which is inclined at a more acute angle to the horizontal and this water drops with a dropping trajectory 29. On account of the air resistance the water drops onto the section being irrigated at a steep slope which for practical purposes is almost vertical or may be considered as vertical. Thus by oscillating the nozzles in an arc each of the strips 21 is irrigated from the near edge 24 to the remote edge 27 and as the tractor and truck are towed lengthwise of the field parallel to the irrigation ditch substantially half of the field is irrigated. The section indicated by the measurement 30 between the ditch and the line 24 along which the tractor and truck operate is irrigated by irrigation nozzles either directly connected to the truck or operated from the truck by hand or in any other suitable manner independent of the trajectory system of irrigation.

Next referring to the manner of irrigating illustrated in connection with Figs. 11 and 12 the field irrigated is designated by the numeral 31 and this is preferably irrigated by first towing the truck longitudinally of the field adjacent the ditch 18 and by means of discharging the water following the trajectories 32 and 33 sections of the field are irrigated between the distance lines 34. This irrigates what may be termed a near strip 35 which is closest to the truck and to the irrigation ditch longitudinally of the field.

After this strip 35 has been irrigated the tractor and truck may be reversed in direction and irrigate the strips indicated by measurement line 36 by discharging the water to follow the trajectories 37 and 38. This irrigates the more remote strips indicated 39 longitudinally of the field and thus by the whole trajectory system irrigate the field by covering two adjacent strips longitudinally of the field. The strip 40 between the ditch and the near margin of the strip 35 may be irrigated from the truck in a suitable manner as indicated in connection with Figs. 9 and 10.

A particular type of installation on the spray nozzles and pumping and distributing plant is illustrated in particular in connection with Figs. 1 to 4, inclusive. In this installation the top of the truck body is indicated by the numeral 50 on which there is constructed a frame 51. This frame 51 has a base 52, a pair of posts 53 which are constructed of spaced plates 54, these preferably being parallel plates. Such plates extend upwardly from a leg 55. An outer leg 56 is connected to the leg 55 by a horizontal brace 57. Arcuate segments 58 which are formed of spaced bars 59 connect the top of the posts 53 and the legs 56. These bars have rack teeth 60, and degree graduations 60'. Rods 61 connect the legs 56 and upper rod 62 connects the top of the posts 53. An axle shaft 63 is positioned at the lower portion of the posts 53 and connects across these posts.

Mounted for oscillating movement on the shaft 63 there is an arm 64 having a hub 65 journalled on the shaft 63. The arm is provided with a counterweight 66. Such arm fits between the plates 54 and the bars 59 of each arcuate segment 58. Each arm has a handle 67 extending beyond the segment 58 and each handle is provided with a slot 68 in which slides a latch bolt 69, the latch bolt being adapted to engage between any two teeth of the rack 60. This gives a hand adjustment for the arms. There are thus two arms spaced apart the distance of the spacing of the posts 53.

Connected to the arms 64 there are nozzle clamps designated by the assemblying numeral 70 (note Figs. 5 and 6). These clamps have a strap 71 with a curved section 72 engaging around each arm 64 illustrated as secured thereto from longitudinal slippage by wedges 73. Each strap has a series of depressed curved sections 74 to accommodate the nozzle pipes 75. The nozzle pipes are indicated as having shoulders 76 and rubber bushings 77, there being a space 78 between the edges of the strap 71 and the shoulders so that the rubber bushing may have a flange 79 extending through this space.

In order to attach the under plates 71 of the clamp securely to the arm 64 clamp straps 80 are hinged at 81 on the outside of each arm 64 and clamp the section 72 by means of bolts 82. The clamp straps 80 terminate at the joint 83. Upper clamp straps 84 have cylindrically curved sections 85 to engage around the upper side of the bushings 77 surrounding the nozzle pipes. The upper and the lower straps are secured together by means of bolts 86, thus to change the nozzle pipes and nozzles it is only necessary to remove the upper clamp straps 84, the lower strap being left attached to each of the arms 64 unless it is desired to change the whole clamp. The nozzle pipe is illustrated as having a discharge nozzle 87 which may be of any desired type and shape and is secured to the nozzle pipe 75 in any suitable manner.

The construction for oscillating the nozzle assemblies utilizes a sliding sleeve 88 (note Fig. 2) mounted on each arm 64 and each sleeve is prevented from rotation on the arm 64 by providing the arm with a longitudinal groove 89 in which may slide a key 89' on the sleeve 88. Each sleeve is also provided with an oscillating drive pin 90, this pin being on the outside of the sleeve and which drive pin operates in a cam groove 91 on the rotatable cam 92. There are two cams illustrated, each being on its own cam shaft 93. Each cam shaft is slidably mounted in bearings 94 (note Figs. 1 and 2), these bearings being supported in bearing posts 95 located on the top of a stand 96. Each stand is located at one side of and outside of the posts 53. In the lower portion of each stand there are lower bearings 97 supported on bearing posts 98, themselves supported on a table 99 in each stand 96. A shaft 100 is rotatably mounted in each of the journals 97 and has a worm wheel 101 connected thereto which wheel is driven by a worm 102 on a worm shaft 103 (note Fig. 2). A chain drive 104 extends from the shaft 100 to the shaft 93 and thus rotates the cam.

Each cam shaft 93 may be moved longitudinally to change the cams by means of a lever 105 pivoted at 106 on a bracket 107 and connected to the stands 96. This arm 105 is held in adjusted positions by means of a pin 108 engaging in a perforation 109 in a bracket arm 110 secured to the stand 96. The upper end of the lever 105 is pivotally connected as indicated by the pin 111 to a groove or the like in the cam shaft 93. When the cam shaft is pulled outwardly it disengages the pin 90 from the groove of the cam and permits removal of the cam and replacement by another cam. Both of the cam shafts 93 are driven in exact synchronism by each having a similar drive worm shaft 103, thus both of the cams are rotated in exact synchronism and each oscillates its own arm 64 and as the two arms 64 support the nozzle assemblies these nozzle assemblies oscillate in a vertical arcuate path.

Each worm shaft 103 is driven from a change speed gearing also having a clutch mounted in the gear case 112. (Note Figs. 1 and 3.) The system of gear drive or the variable change of gears is not illustrated, as either standard equipment or a specially designed gear train may be used of the change speed type. Standard clutches and variable speed mechanisms may be used. The change of speed is indicated by the use of change speed arms 113 operating in slot 113' at the top of each gear case. The gears in the gear case are actuated by a common drive shaft 114 (note Figs. 1, 2 and 4) which drive shaft is journalled in bearing posts 115 and such shaft is rotated by a drive pulley 116, this pulley being driven in any suitable manner as by a gas engine mounted on the truck or in any other suitable manner. The clutches in the gear boxes 112 are actuated by the clutch levers 117, there being a lever for each box and these levers are connected by a connecting rod 118 so that by grasping the rod 118 both of the clutch levers may be actuated at the same time and thus connect or disconnect the drive through the gear boxes to the worm shafts 103.

The system for supplying water utilizes a pump 119 indicated as of a centrifugal type connected to the shaft 114. This pump has an intake 120 and a discharge 121. The intake may be connected by suitable suction pipe 122 (note Fig. 9) with the water ditch 18. It is manifest that water may be taken from an irrigation pipe or other suitable source of supply by means of a supply hose, the irrigation pipe being parallel to the path of the irrigating truck.

A standpipe 123 is connected to the discharge of the pump and in this standpipe there is a regulating or shut-off valve 124 and also a pressure regulating valve 125. These may be of standard types. A pressure gauge 126 is also used. The standpipe connects to a manifold 127 which extends horizontally and above the manifold and connected thereto there is a pressure chamber tank 128. The manifold is provided with a plurality of outlets 129 and from each outlet a flexible hose 130 connects to each nozzle pipe, each nozzle pipe being illustrated as having a flange 131 (note Fig. 1) forming a coupling with the flexible hose. Thus, as the arms 64 oscillate and swing the nozzle pipes and nozzles in an arc the water is conveyed by the flexible hose from the water manifold to each nozzle pipe and nozzle.

In order to obtain a record of the amount of water discharged I utilize an automatic recording pressure gauge 132 connected by a pipe 133 to the water manifold. In addition, as it is desirable to have a record or account of the oscillations of the nozzles, I utilize a counter 134 which is connected by a chain drive 135 to the shaft 93. By knowing the quantity of water discharged at each oscillation of the nozzles and the total number of oscillations, the total quantity of water spread on the ground may be calculated. The shape of the cam is designed to give an unequal arcuate velocity to the oscillating nozzles so that the spread given to the water will be substantially of even depth over the complete throw of any individual nozzle, that is, from the place nearest the truck to the place most remote in the throw of the water. If the oscillations of the nozzles were at a constant angular velocity the spread of water would be uneven, in that there would be a greater depth of water deposited on the more distant parts to be irrigated than on those near the truck, Manifestly, by changing the cams and the characteristics thereof different relative speeds and motions can be obtained. Also, by changing the gear ratio in the gear boxes different rates of oscillation may be obtained. If it is desired to irrigate any particular place in a field which has been inadequately watered, possibly due to the water being blown by the wind, the clutch may be thrown out and the nozzles operated by hand using the hand grip 67 and adjusting the nozzle supports at any particular place in the arcuate segment 58.

In some cases I find it desirable to inject air in the streams of water in order to give a spread to the water to reduce the size of the water drops and also to aerate the water. This I do by the nozzle construction shown in Figs. 7 and 8. In this case I employ nozzle pipes 75 similar to those described in connection with Figs. 5 and 6 and connect these to the water manifold in a similar manner. However, I use special nozzles 136 which have an air coupling 137, this combination being a known and standard type of nozzle and air injector. An air manifold 138 is secured by clamps 139 to one of the clamping assembly bars 70, this preferably being the one closest to the nozzles. An air hose 140 connects to the manifold and from the manifold there are air pipes 141 which lead to the air couplings 137. An air pump or air compressor may be driven by a pulley 142 on a shaft 114. Such compressor is of standard construction and is not illustrated herein. With this construction of air connections to the nozzles the water and air will be discharged at the same time and during the oscillation of the nozzles.

In some cases if the lift from the source of the water supply is too great it is necessary to use a force pump to elevate the water to the centrifugal pump on the truck. This may be done by employing a drive from the pulley 143 on shaft 114 to operate the force pump which may be located at the source of the water supply.

Important characteristics of my system of irrigation have to do with the manner in which the water descends on the area to be irrigated and which, if there are young crops, it is important that these are not injured by the descending water. With the trajectory system of irrigating the water within the effective ranges of the nozzles falls almost vertical or at angles slightly to one side of the vertical. A study of discharges of water is given in "Experiments relating to hydraulics of fire streams" by John R. Freeman, "Transactions American Society of Civil Engineers", Volume XXI, pages 302 to 461 together with discussions by Herschel, Merriman and others, pages 462, 468 and "The nozzle as an accurate water meter" by John R. Freeman, "Transactions American Society of Civil Engineers", Volume XXIV, pages 492 to 513. As mentioned in the prior specification my system of irrigating overcomes to a great extent the irregular deposit of water on an area to be irrigated from oscillating overhead sprinklers by varying the angular velocity of the oscillation of the nozzles in their complete cycle. A study of a spread of water in overhead irrigation with oscillating spray pipes is given in "Tests of Spray Irrigation Equipment", F. E. Staebner, United States Department of Agriculture, Washington, D. C., Circular No. 195, November, 1931.

Another advantage of my system of irrigation is that the land does not need to be levelled as it does for surface irrigation nor does the path of the truck require to be on level ground. In addition, on account of the control of the throw of the water, the path of the truck does not need to be in a straight line but may follow contours of the ground if desired. It is obvious that the advancement of the truck carrying the spray nozzles and pump may be intermittent in order to irrigate sections of land or it may have a slow continuous movement. It is also obvious that liquid fertilizers or fertilizers carried by the water may be used in connection with irrigation or other agents used in agricultural work may be used such as insect sprays, etc.

In order to provide cams for developing different angles of movement of the oscillating arms it is sometimes necessary to change the position of the cam shaft in reference to the axis of oscillation of the nozzle pipes and nozzles. In order to obtain a horizontal adjustment I provide the feet 145 with longitudinal slots 146 so that these may be shifted slightly in a horizontal plane. In addition, to provide for raising and lowering the cam shafts 93, I construct the stands 96 with turn-buckles 147 inserted to raise or lower the upper portion of the stands. These turn-buckles have right and left hand threads and a wrench grip head for rotating the turn-buckle screws. By this construction the position of the cam shafts may be regulated relatively to the center of oscillation of the nozzles.

In Fig. 14 the chart has the abscissa 148 divided into distances in feet. The ordinate 149 is graduated in angles of elevation of the discharge nozzles in degrees. The curves 150 developed for different pressures from 10 pounds to 70 pounds per square inch show the reach obtained in the discharge of water. The line 151 passes through the points of maximum reach at each specific pressure. For instance, referring to the curve showing the reach at 30 pounds pressure with the particular type of nozzle used, the reach is approximately 100 feet and the elevation angle of the nozzle would be substantially 35°, that is to say, the nozzle would be swung from an angle of elevation of 80° or 85° to a minimum angle of elevation of 35° under those conditions. Although the chart shows the curves of reach as developed with the nozzles at 0 degrees and 90° of inclination it would be obvious that no irrigation would be done with the nozzles vertical. The nozzles might approach the vertical at an angle of 80° or 85° and at 80° the throw would be approximately 20 feet. Therefore, for instance, using a low pressure of 30 pounds to the square inch a strip of ground could be irrigated between 20 and 100 feet from the irrigating plant.

A further irrigation in the same direction may be obtained by increasing the pressure, say, to 50 pounds in which the strip from 100 to 150 feet might be irrigated using 50 pounds pressure. To reach the point 100 feet distant the nozzle should have an elevation of approximately 65° as a maximum elevation and approximately 32½° for the minimum elevation and obtain a reach of approximately 150 feet.

It will thus be seen that my system comprehends irrigating strips of land in the same direction from the irrigating plant by the trajectory system of projecting water in which a near strip is irrigated with the water under low pressure and the more remote strip or strips with the water at higher pressure.

Various advantages of aeration of water for irrigation, such as absorption of oxygen, removal of carbonic acid and hydrogen sulphide result from my system of irrigation as the spray is broken up into fine drops and brought into intimate contact with the air.

It will be appreciated on account of the relatively small unit size of my irrigating plant, its portability and the variable range or reach of irrigation, that it is suitable for irrigating sections of land of irregular shape and also irrigating both small and large fields. It may be used for garden plots, orchards or large field areas.

Various changes may be made in the details of construction without departing from the scope of the invention as defined by the appended claims.

I claim:

1. A method of irrigation comprising projecting streams of water in an arcuate, vertical oscillating movement at variable speeds and at the same time forcing air into the water streams to break up the streams into small drops and thereby irrigating a strip of ground due to the varying trajectories of the combined water and air streams from a position adjacent the discharge point of the streams to a position more remote therefrom, the angular movement being at a relatively slow speed at high elevations and a relatively higher speed at low elevations.

2. An irrigation apparatus comprising in combination, a frame structure having a pair of arms pivoted thereon on the same horizontal axis, a plurality of nozzle pipes each having a nozzle clamped to said arms in the plane of the arms, means to continuously oscillate said arms, a flexible connection to each of the nozzle pipes and means to supply water under pressure to each of the said flexible connections.

3. An irrigation apparatus as claimed in claim 2, the means to oscillate the arms having a construction to give a variable angular velocity to the arms, said velocity being at a relatively low speed at high elevations of the arms and at higher speeds at low elevations of the arms.

4. An irrigation apparatus as claimed in claim 2, the means to oscillate the arms comprising a rotatable cam, a sliding connection between the cam and the arms, the said cam having a configuration to give a relatively low speed of angular movement to the arms when at a higher elevation and a relatively higher speed when at a lower elevation.

5. An irrigation apparatus comprising in combination a frame structure having a pair of arms pivotally connected thereto, the pivot being horizontal, nozzle clamps connecting the arms, each having a plurality of nozzle pipes with nozzles thereon, the plane of the arms and the nozzle pipes being substantially radial from the pivots of the arms, a pump having a manifold, a flexible hose connecting from the manifold to each pipe, a pair of rotatable cams mounted on the frame, each cam having a slidable connection with an arm, both cams being similar to oscillate the arms at a variable speed of angular movement, the rate of angular movement being lower at higher elevations and higher at lower elevations.

6. An irrigation apparatus as claimed in claim 5, the frame having a pair of vertical posts and a pair of horizontal braces, the axis of oscillation being at substantially the corner formed by the braces and the posts, and an arcuate rack connecting the outer ends of the braces and posts and a locking means on the arms to lock said arms to the rack at a desired angle of elevation.

7. A method of irrigating comprising, oscillating parallel streams of water all in the same plane and oscillated on a common horizontal axis, discharging the water at a substantially constant pressure and varying the angular velocity of movement in the arc whereby the oscillation is at a slower angular speed at higher elevations and graduated to a faster angular speed at lower elevations, and changing the position of the oscillation of the discharged water longitudinally of the axis of oscillation, injecting air into the streams of water prior to their oscillation to break the streams into small drops, the combined oscillation of the water streams together with the variable angular velocity giving substantially an even deposit of water between the locations relatively near and remote from the axis of oscillation of the water streams.

8. An irrigating apparatus, comprising in combination a frame, an arm pivotally connected thereto, a nozzle pipe clamped to the arm, a flexible hose connected to the pipe, a sleeve slidably mounted on the arm, a rotatable drive shaft, an operating connection between the shaft and the sleeve to slide the sleeve on the arm and to move the sleeve variable distances from the said shaft to thereby oscillate the arm.

9. An irrigating apparatus, comprising in combination a frame having a pivotally mounted arm, a nozzle pipe clamped to the arm and having a flexible hose connected thereto, a sleeve slidably mounted on the arm, a rotatable cam shaft, a cam on the shaft having an engagement with the sleeve whereby on rotation of the cam shaft and cam the sleeve is moved longitudinally on the arm and the distance between the sleeve and the cam shaft is varied.

10. An irrigating apparatus as claimed in claim 9, the cam having a contour to give the arm a variable angular velocity during its oscillation.

11. An irrigating apparatus having a frame, an arm pivotally mounted therein, a nozzle pipe clamped to the arm having a flexible hose connected thereto, a sleeve slidably mounted on the arm, a cam shaft, a cam mounted thereon, a connection between the cam and the sleeve, whereby when the cam shaft and cam are rotated, the sleeve is moved longitudinally on the arm and moved variable distances from the cam shaft to thereby oscillate the arm, the contour of the cam being such that the arm has a lower arcuate velocity when at a high angle in reference to the horizontal and a greater angle of velocity when at a low angle in reference to the horizontal.

WILLY H. RABE.